(12) United States Patent
Becker et al.

(10) Patent No.: US 11,164,122 B2
(45) Date of Patent: Nov. 2, 2021

(54) CONTROLLING SYSTEM AND METHOD

(71) Applicant: CYBER OBSERVER LTD., Caesarea (IL)

(72) Inventors: Shimon Becker, Pardesia (IL); Moti Ram, Ram On (IL); Meir Peretz Baron, Petach Tikva (IL)

(73) Assignee: CYBER OBSERVER LTD., Caesarea (IL)

( * ) Notice: Subject to any disclaimer, the term of this patent is extended or adjusted under 35 U.S.C. 154(b) by 99 days.

(21) Appl. No.: 16/115,604

(22) Filed: Aug. 29, 2018

(65) Prior Publication Data

US 2018/0374018 A1 Dec. 27, 2018

Related U.S. Application Data

(63) Continuation-in-part of application No. 14/296,468, filed on Jun. 5, 2014, now abandoned, which is a continuation-in-part of application No. 14/360,934, filed as application No. PCT/IL2012/050465 on Nov. 19, 2012, now abandoned.

(30) Foreign Application Priority Data

Nov. 28, 2011 (IL) .......................... 216647

(51) Int. Cl.
*G06Q 10/06* (2012.01)
*G06F 9/50* (2006.01)
*G06Q 10/10* (2012.01)
*H04L 12/24* (2006.01)

(52) U.S. Cl.
CPC ..... *G06Q 10/06313* (2013.01); *G06F 9/5061* (2013.01); *G06Q 10/0631* (2013.01); *G06Q 10/06311* (2013.01); *G06Q 10/101* (2013.01); *H04L 41/5045* (2013.01)

(58) Field of Classification Search
CPC .. G06Q 10/00; G06Q 40/00; G06Q 10/06313; G06Q 10/0631; G06Q 10/06311; G06Q 10/101; G06F 9/5061; H04L 41/5045
USPC ....................................................... 705/7.23
See application file for complete search history.

(56) References Cited

U.S. PATENT DOCUMENTS 7,072,934 B2 * 7/2006 Helgeson ................ G06F 9/468
709/203
7,155,380 B2 * 12/2006 Hunt ...................... H04L 41/069
703/21

(Continued)

*Primary Examiner* — Romain Jeanty
(74) *Attorney, Agent, or Firm* — AlphaPatent Associates, Ltd; Daniel J. Swirsky

(57) ABSTRACT

A management system for controlling a layout of physical and logical resources, the system including manipulation tools for manipulating physical and logical data flowing between computers and the resources, the manipulation tools including: at least two characters for each of the resources; at least two servicing-items, each for handling one character of the at least two characters, thereby at least one of the resources is serviced by the at least two servicing-items; each of the at least two servicing-items delivers logic events of the logic events regarding the one character handled thereby of the at least one of the resources being serviced by the at least two servicing-items, to the other servicing-item not handling that character.

5 Claims, 4 Drawing Sheets

(56) References Cited

U.S. PATENT DOCUMENTS

| | | | | |
|---|---|---|---|---|
| 8,625,568 B2* | 1/2014 | Kwak | ................... | H04L 5/0092 |
| | | | | 370/342 |
| 9,170,843 B2* | 10/2015 | Glew | ................... | G06F 9/5011 |
| 9,459,922 B2* | 10/2016 | Flemming | ............. | G06F 9/4881 |
| 2004/0061701 A1* | 4/2004 | Arquie | ................... | H04L 41/12 |
| | | | | 345/440 |
| 2005/0262194 A1* | 11/2005 | Mamou | ................ | G06F 16/254 |
| | | | | 709/203 |
| 2009/0171720 A1* | 7/2009 | Crook | ................... | G06Q 10/04 |
| | | | | 705/35 |
| 2010/0179847 A1* | 7/2010 | Cope | ................. | G06Q 10/0635 |
| | | | | 705/7.28 |
| 2016/0301558 A1* | 10/2016 | Twiss | ................... | H04L 41/147 |

* cited by examiner

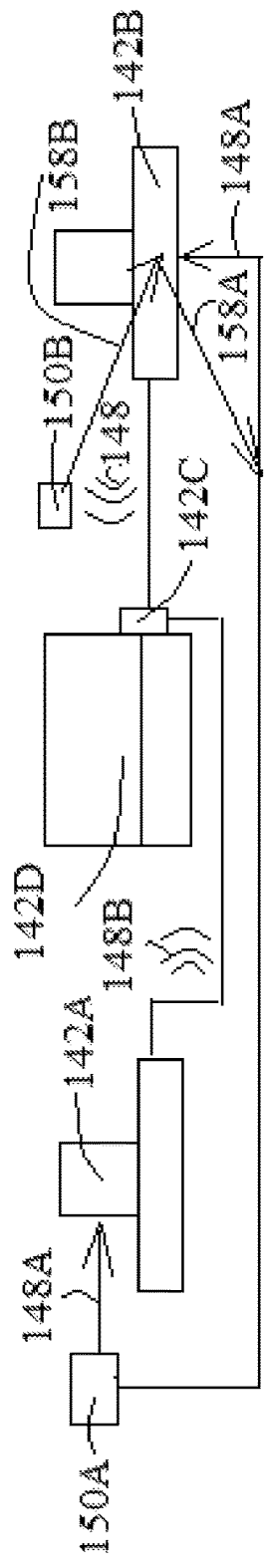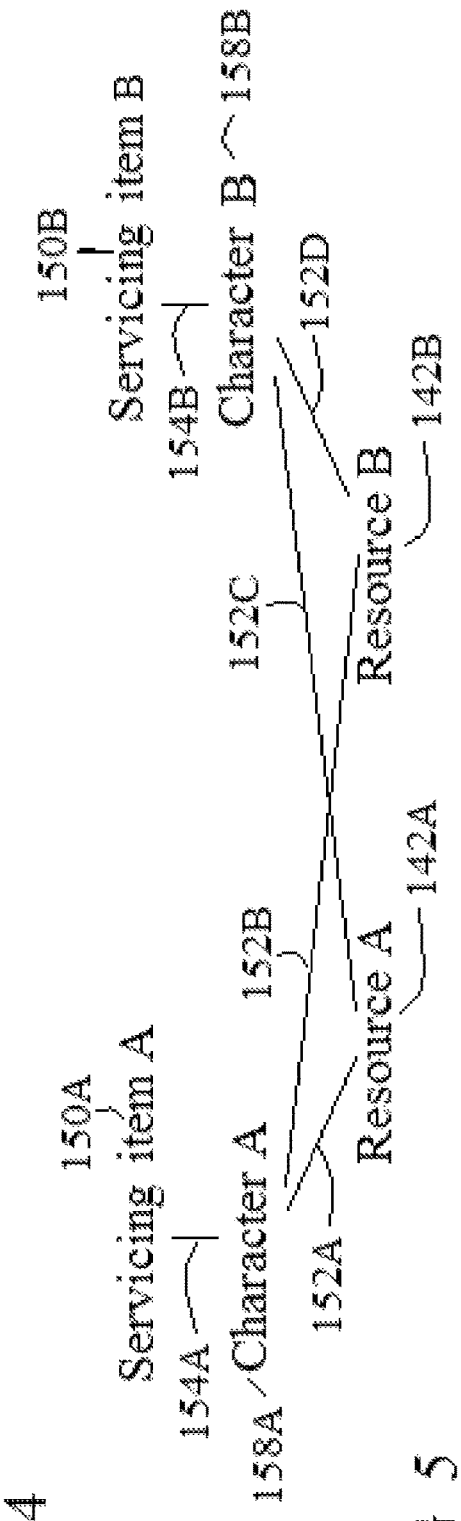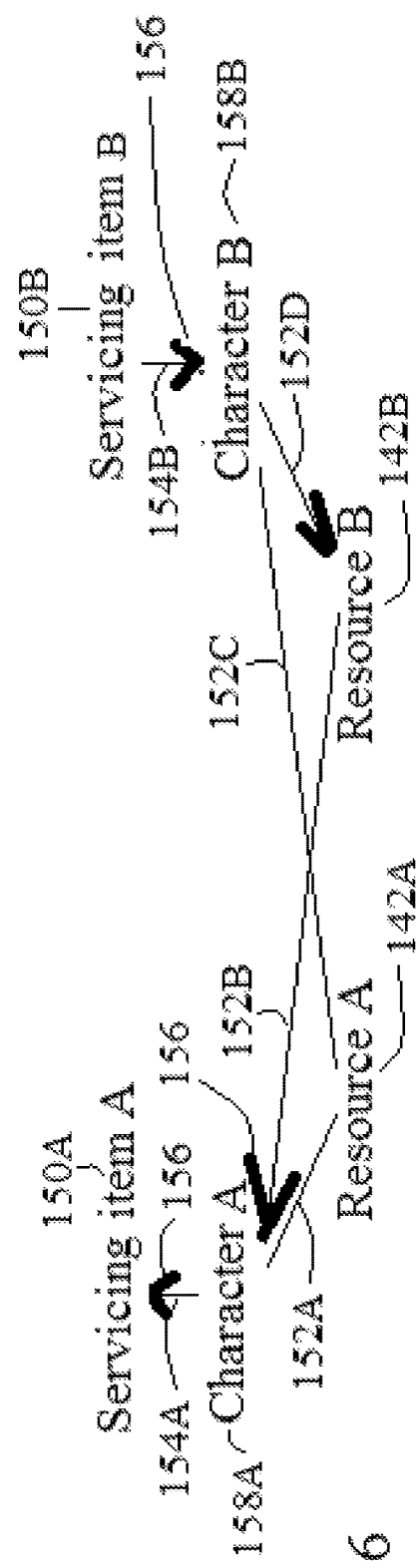

CONTROLLING SYSTEM AND METHOD

CROSS-REFERENCE TO RELATED APPLICATIONS

This application is a Continuation-in-Part of U.S. patent application Ser. No. 14/296,468, filed Jun. 5, 2014, which claims the benefit of priority from U.S. patent application Ser. No. 14/360,934, filed May 28, 2014, which is a U.S. National Phase Application under 35 U.S.C. 371 of International Application No. PCT/IL2012/050465, filed Nov. 19, 2012, which claims the benefit of priority from Israel Patent Application No. 216647, filed Nov. 28, 2011, the disclosures of which are incorporated herein by reference in their entirety.

TECHNICAL FIELD

The present invention relates to the field of Business Service Management systems.

BACKGROUND

Business Service Management (BSM) is generally associated with directing the resources of an organization to better manage/monitor the business services of the organization. By focusing IT resources in the organization to better support the information needs of departments within the organization which are directly, and sometimes indirectly, involved with the clients, BSM frequently results in the organization better responding to the needs of its clients. Potential advantages of BSM may include, among others, improved relationships with customers, improved relationships with company suppliers, service quality improvements, and efficiency improvements, among others.

Most, if not practically all, BSM systems known in the art rely on the IT resources (including IT personnel) of the organization for supporting the system. IT is generally responsible for gathering information from the various organizational departments. IT is also responsible for processing the information and for disseminating the results to different personnel within the organization. One of the drawbacks is that the information collected is usually according to a predetermined format and may not necessarily reflect a particular information need associated with a specific service being provided. Another drawback is that any modifications required in the system related to information collection and/or processing are dependent on the IT resources, and if carried out, are usually at an additional cost to the organization and/or incurring time delays.

Known providers of BSM systems include AccelOps Inc., BMC Software Inc., HP Inc. (HP Business Management Software), Oracle Inc. (Oracle Enterprise Manager Software), IBM Inc. (IBM Tivoli Software), Novell Inc. (Novell Business Service Management), Zyrion Inc. (Zyrion Traverse), Computer Associates Inc., ASG, Digital Fuel, Opteir, Smarts and Compuware Inc. All these systems, as previously discussed, are based around the IT resources and therefore are limited as to flexibility in collecting and processing information associated with a specific service.

It is an object of the present invention to provide a user application for designing physical and business components and dynamic relations therebetween, since this combination represents the real features of the organization.

Other objects and advantages of the invention will become apparent as the description proceeds.

SUMMARY

A management system for controlling a layout of physical and logical resources, the system including manipulation tools for manipulating physical and logical data flowing between computers and the resources, the manipulation tools including:
  at least two characters for each of the resources;
  at least two servicing-items, each for handling one character of the at least two characters, thereby at least one of the resources is serviced by the at least two servicing-items;
  physical events delivered to and from the resources, the physical events including inputs indicating physical changes in the resources and physical signals; and
  logic events between the at least two servicing-items, induced by the physical events,
  wherein each of the at least two servicing-items delivers logic events of the logic events regarding the one character handled thereby of the at least one of the resources being serviced by the at least two servicing-items, to the other servicing-item not handling that character.

BRIEF DESCRIPTION OF THE DRAWINGS

Embodiments and features of the present invention are described herein in conjunction with the following drawings:

FIG. 4 depicts the physical events between the physical resources.

FIG. 5 is a block diagram of the example of FIG. 4, to be handled by the system.

FIG. 6 is the block diagram of FIG. 5, adding a streaming example obtained by the system.

Figure 1:
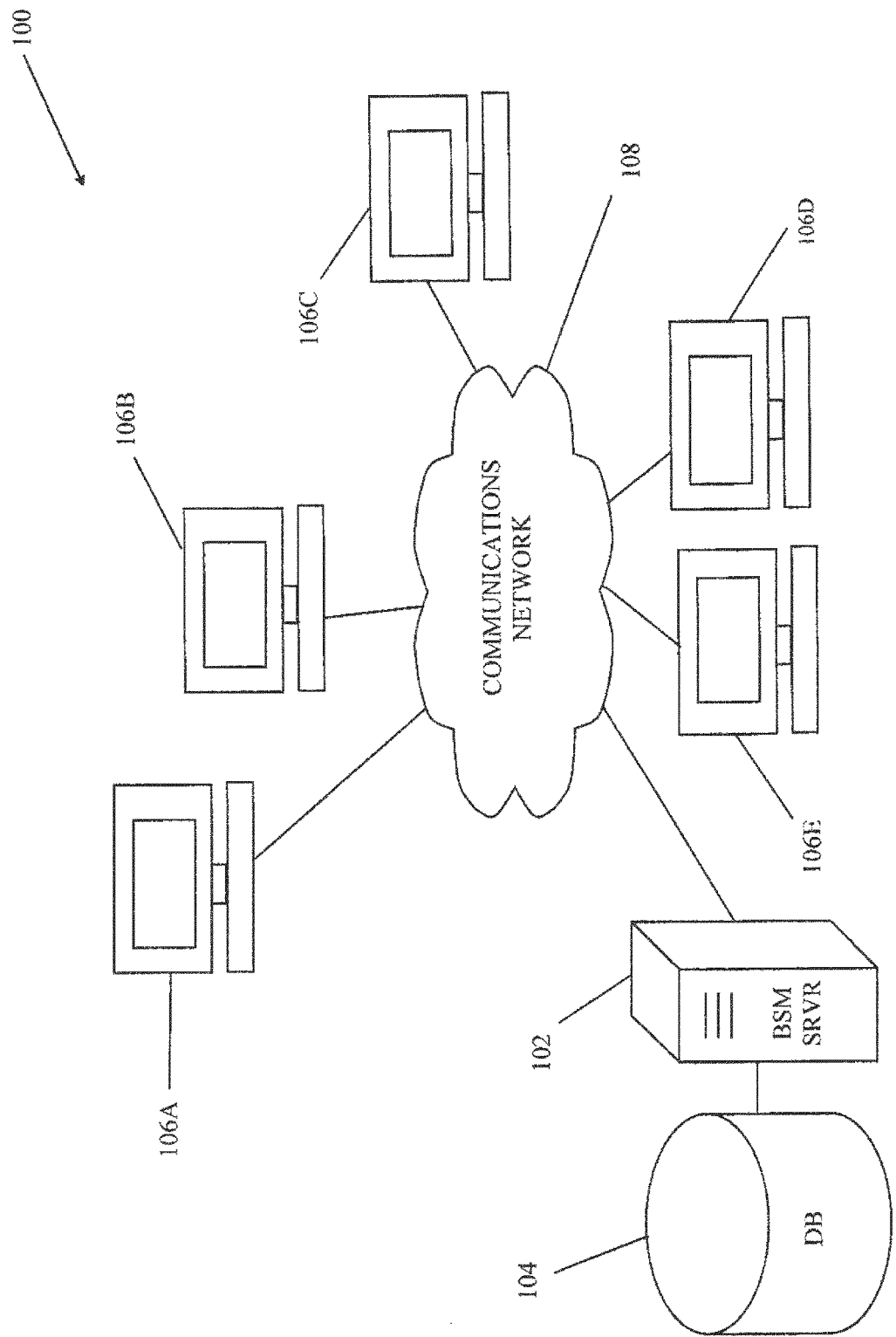
FIG. 1 schematically illustrates a BSM system, according to an embodiment of the present invention.

It should be understood that the drawings are not necessarily drawn to scale.

DETAILED DESCRIPTION

Glossary

"Service"—A non-material good produced by an organization supplied inside or outside the organization. The service may be of a commercial or a non-commercial nature, for profitable or non-profitable means, and the good may be in the form of a tangible and/or an intangible commodity. Examples of services include electronic mail, communications networks, computer software, databases, computer hardware, furniture, building, accounting service, legal service, vehicle repair parts, vehicle repair service medical service, transport service, or any other type of service according to the nature of the business using the system. In some embodiments, a service may be classified under one of the followin categories: business services, technological services, infrastructure services, and human resources services.

"Service team"—A team of the organization, being responsible to produce one or more services being related to each other.

"Physical resource" (physical object)—any item or collection of items having a physical character of any value, acquired from any source, and which form part of, or are used as part of a process to arrive at, the service provided. Examples of a physical resource or object include hardware, software program, computer data file, database, data storage device, UPS (uninterruptible power supply), cash register (including POS terminal), vehicle, road, production equipment, personnel, among others.

"Logical resource" (logical object)—any item or collection of items which form part of, or are used as part of a process to arrive at, the service provided, and which is not a physical resource (object). Examples of a logical resource or object include processes, user's guide, job position, work group, logical disk, and flow chart, among others.

"Relationship"—a meaningful connection between two resources, or between a resource and a service. The relationship can have characters and status as defined for logical resource. The meaning of the relationship can be for example—

Containment—one resource contains the other.
Information Flow—some information moves between the two resources, or between the service and the resource.
Knowing—one resource knows the other (e.g. two persons).

A user can define more types of connections.

"User"—any member of an organization responsible for managing and/or monitoring a business service within the organization. Examples of a user may include a head of a corporation, a department head within a corporation, a process engineer, a production supervisor, an engineer, a CFO, a CTO, among others.

"Controlling (a resource)"—monitoring and manipulating an operation of a resource, whether a physical resource or a logical resource.

"DBMS", the acronym of "Database Management System"—a database coupled with manipulation tools, such as a provided by an SQL (acronym of Structured Query Language).

An aspect of an embodiment of the present invention relates to an automated business service management (BSM) system configured for allowing a user to design a service including only resources specifically associated with the service. Optionally, the resources include physical and/or logical resources. In some embodiments, the BSM system allows the user to define the resources to be associated with the service. By allowing the user to define the resources, managing and/or monitoring of a service is based only on the resources which are of interest to the user, thereby eliminating the effects on the service introduced by resources which are not of interest. The BSM system as described in some embodiments of the present invention, reduces dependency on IT resources of the organization and allows for potentially more accurate managing and/or monitoring of provided services.

In some exemplary embodiments, the system includes an application generator configured for allowing a user lacking any programming experience or database operation knowledge to design the service, incuding defining the user resources. Optionally, defining the user resources includes the user selecting from a database in the system any one or any number of service objects, physical objects, and logical objects, associated with a service, a physical resource, and a logical resource, respectively. Additionally or alternatively, the user may create a new service object, a new physical object, and/or a new logical object which may be included into the database. In some embodiments, designing the service is query-based (e.g. "wizard") and the user follows instructions provided by the system. Additionally or alternatively, defining the resources is wizard-based. Alternatively, designing the service and/or defining the resources is menu-driven. In some embodiments, each object is assigned one or more characters identifying the object. Optionally, the assigned character includes characteristics of the object associated with a particular service. In some embodiments, the objects are created by a system administrator or a system designer.

In some exemplary embodiments, the system includes infographics for enabling visual display of the design of the service, including service, physical and logical objects included in the design. Optionally, the design of the service and the objects are displayed on a computer screen or other type of display device. Optionally, the interaction between the physical and logical objects and the service object is displayed. In some embodiments, the infographic display is real-time as the user selects or creates the objects. In some embodiments, the display is menu driven with the different objects and services displayed inside containers. Optionally, the files are arranged on the display in a hierarchical configuration (tree configuration). Alternatively, the display shows the files including the objects on a display background (not arranged in a tree configuration). In some embodiments, the design of the service is printable in hard copy form using a printer.

In some exemplary embodiments, the database stores all the objects and all the services. Optionally, the objects are created by one or more users of the system. Optionally, the newly created objects are automatically stored in the database. Additionally or alternatively, the objects are imported into the system database from one more more diverse object sources which may include existing BSM systems known in the art, or other database sources. Additionally or alternatively, the object sources may include application programs and/or file systems known in the art. Additionally or alternatively, the objects are manually stored in the database by the user. In some embodiments, the objects in the database each include its own particular characters assigned by the user who created the object. In some embodiments, an existing object can be modified by a same user or a different user. Optionally, modifying the characters of an object generates a new object which is stored in the database. In some exemplary embodiments, manipulation of all data stored in the database is done by the system administrator or the system designer, including creating and modifying object, assigning characters, importing data from other sources, among others. Optionally, the system administrator or the system designer assign the characters to the objects based on user-specified requirements.

In some exemplary embodiments, a design of a service is created by a user by combining service objects with physical and/or logical objects. The objects may be created by the user or may be downloaded from the database. Optionally, the objects are directly imported into the design from sources other than the database. The characters of the objects may be included in the objects, may be defined real-time by the user as the design is being created, or may be imported from sources other than the database.

In some exemplary embodiments, the BSM system is configured for use with any type of service sectors. Optionally the service sectors are not geographically bounded and may be physically located in one place or distributed throughout a plurality of geographically remote locations. Examples of such service sectors include banking, mobile phone communications, advertising, airline transport, hotels, restaurants, shipping, among many other.

In some exemplary embodiments, the BSM system may include modules having templates suitable for designing services associated with a particular service sector. The templates may include service objects, physical objects, and logical objects associated with services provided in the respective service sectors. For example, a module may include templates for banking services, while another module may include templates for use with the airlines transport services. Optionally, a module may include templates for more than one service sector. In some embodiments, the modules may be individually purchased by a user. Optionally, the modules are commercially available for purchase as a software package, for example, in disc form. Additionally or alternatively, the modules are downloadable from a website. Additionally or alternatively, the modules include packaging suitable for connecting to the devices, either through an external connection, for example a USB connection, or internally installed in a processing device, for example in the form of an electronic chip. In some embodiments, a module may be uploaded by a user to a "solutions shop" as a configuration file which is available for use by other users.

In some embodiments, the BSM system is a server-based system including processing devices connected through a communications network to a BSM server with a data storage including the database. The BSM server may be a single server or optionally may be distributed over a plurality of servers. Optionally, the data storage is a data storage device connected directly to the BSM server. Optionally, the data storage is a distributed storage system to which the BSM server connects through the communications network, and may include one or more tiers. The processing devices may include personal computers, portable computer, tablet PC, smartphones, personal digital assistant, or any other type of processing device suitable for connecting through communications network to the BSM server and for allowing a user to design the service. Optionally, the processing devices include infographics display capability. Additionally or alternatively, the processing devices are configured to connect to devices capable of displaying the infographics. The communications network may be a wide area network (WAN) server, a global WAN such as the Internet, a local area network (LAN) server, a wireless communication network which may include a mobile phone network, a wire communication network (for example, Ethernet-based network), or any other type of communication network suitable for connecting the processing devices with the BSM server, or any combination thereof.

The present invention will be understood from the following detailed description of preferred embodiments, which are meant to be descriptive and not limiting. For the sake of brevity, some well-known features, methods, systems, procedures, components, circuits, and so on, are not described in detail.

Reference is now made to FIG. 1 which schematically illustrates a BSM system 100, according to an embodiment of the present invention. BSM system 100 includes a BSM server 102 including a data storage 104, a plurality of processing devices 106A-106E having data entry and visual display capability, and a communication network 108 connecting the processing devices to the BSM server. In some embodiments, BSM system 100 includes a two-tier configuration with BSM server 102 and data storage 104 at one level and processing devices 106A-106E at a second level. Application software for running BSM system 100 is located in BSM server 102 with all data stored in a database in data storage 104. Processing devices 106A-106E serve to provide a visual portal for the users and as means for interfacing with the system. Alternatively, BSM server 102, data storage 104, and processing devices 106A-106E are in a single-tiered configuration.

BSM server 102 is configured for interfacing with processing devices 106A-106E for allowing users on the processing devices to design services for managing and/or monitoring the services according to resources defined by the users. BSM server 102 includes application software which allows processing devices 106A-106E to upload to a database in data storage 104 service objects, physical objects, and logical objects, hereinafter referred to as objects, associated with the services for storage in the database. BSM server 102 additionally allows downloading to processing device 106A-106E objects previously stored in the database. BSM server 102 additionally allows processing devices 106A-106E to modifying objects in the database by allowing their characters to be changed. In some embodiments, BSM server 102 allows uploading, downloading, and/or modifying of objects by processing devices 106A-106E based on user access authorization. Optionally, user access authorization may be based on a user's position within an organization, for example, IT administrator, department manager, process manager, CEO, CTO, service manager, and the like.

Processing devices 106A-106E are configured for allowing the users to manage and/or monitor services by allowing the users to design services on the devices based on user-defined resources. Optionally, processing devices 106A-106E download an application software from BSM server 102 which is stored in the processing devices and is opened by the users whenever a service is to be designed. Alternatively, the application software is installed in the processing devices 106A-106E by the users who have purchased the software. In some exemplary embodiments, the application software allows for processing devices 106A-106E to upload, download, and modify objects and object characters in the database in data storage 104. Access to data storage is through communication network 108 and BSM server 102. Optionally, the characters may be uploaded, downloaded, or modified separately from the objects. In some embodiments, processing devices 106A-106E include modules containing templates associated with specific service sectors of interest to a user. Optionally, the modules are downloaded from BSM server 102. Additionally or alternatively, the modules are separately integrated into processing devices 106A-106E by the users. In some embodiments, the modules are software application programs available on BSM 102 which may be accessed by the processing devices.

Processing devices 106A-106E additionally include, or may be connected to, displays for displaying the infographics of the designs of the services, including the objects. Optionally, other information is displayed including the characters of the objects. In some embodiments, processing devices 106A-106E include data input devices, which may include keyboards, mouse, or touch-screens, or any combination thereof. In some embodiments, processing devices 106A-106E may be connected to printing equipment for reproducing hard copies of the design and other user-required information.

Data storage 104 is connected to BSM server 102 and includes the database wherein are stored all objects including their characters. Optionally, designs of services created by the users on processing devices 106A-106E may be stored in the database. In some embodiments, database may include an object-oriented database as known in the art. Optionally, data storage 104 is a local data storage device. Additionally or alternatively, data storage 104 is a distributed storage system, and may include a virtual cloud storage configuration. In some embodiments, access to the database requires user access authorization. Optionally, user access is controlled by BSM server 102.

Figure 2:
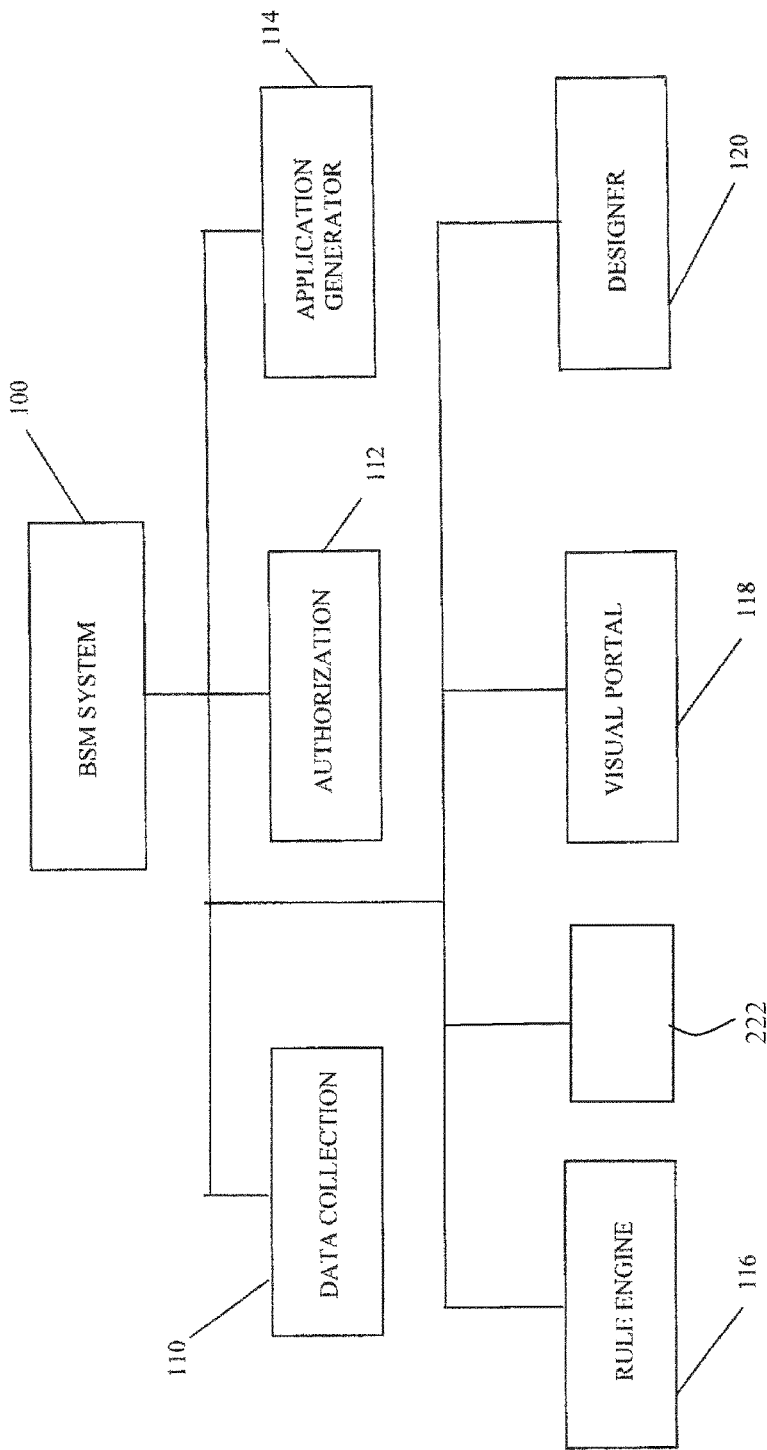
FIG. 2 shows a functional block diagram of the architecture of the BSM system of FIG. 1, according to an embodiment of the present invention.

Reference is now also made to FIG. 2 which shows a functional block diagram of the architecture of BSM system 100, according to an embodiment of the present invention. The architecture of BSM system 100 includes a data collection component 110, an authorization component 112, an application generator component 114, a rule engine component 116, a visual portal component 118, a designer component 120, and a data/event propagation component 222.

Data collection component 110 is configured for collecting data from different sources for storing in the database in data storage 104. In some embodiments, the data collected is in the form of objects. Optionally, the data collected includes the characters of the different objects. The different sources of data may include the actual physical resources, existing databases, information previously stored in applications, data input by users or other organizational personnel (for example IT), data imported from known BSM systems, among others. In some exemplary embodiments, data collection component 110 filters out data portions in the data received from the different sources. Optionally, the user may specify which characters are of interest in the collected data such that the data portions including characters not of interest are filtered out. Additionally or alternatively, the allowable characters in the data collected may be specified by personnel other than the user. Additionally or alternatively, allowable characters may be specified by users or other organizational personnel having adequate access authorization.

Authorization component 112 is configured for assigning access authorization in BSM system 100 to personnel within an organization. The Authorization component 112 classifies the information and by classifying the user also creates a user to information matching rules.

Authorization component 112 may include use of information access authorization methods and systems known in the art. In some embodiments, access authorization may be extended to such actions as uploading/downloading objects in the database, adding/removing/modifying characters in objects, importing data from diverse sources, creating objects, using objects created by other users, modifying BSM system 100 operation, accessing modules, among many others.

Application generator component 114 is configured for allowing user-friendly interfacing between BSM system 100 and the user. Application generator component 114 includes a data virtualization system, for allowing the user to easily create objects and define user resources when designing a service, and for easily uploading and downloading objects and characters to and from the database.

Rule engine component 116 is configured for applying rules to the objects and verifying that the objects' characters conform to predetermined rules. Optionally, the predetermined rules are associated with the user's definition of the resources. In some embodiments, the rules are individually applied to each object and allow for the user to receive information associated with the object characters in a timely manner. Optionally, the information is received real-time. In some embodiments, rule engine component 116 may include use of DROOLS or some other object-oriented rule engine known in the art. Alternatively, the rule engine may be any other type of suitable rule engine known in the art, and not limited to an object-oriented rule engine.

Visual portal component 118 is configured for providing the user with visual display capability of BSM system 100 and of the service on the display of processing devices 106A-106E. Also displayed are the objects and optionally their characters. In some embodiments, display of the system includes displaying information regarding BSM server 102, data storage 104, and communication network 108, including their status. In some embodiments, BSM system 100, including its components, may be displayed as a graph having a set of vertices and edges for allowing a viewer to scroll down the graph to easily access data, which may include system components, database stored files and/or objects, among others.

Designer component 120 is configured for defining and designing the tree configuration of the system displayed by visual portal 118. Optionally, the system administrator and/or the system designer use designer 120. In some embodiments, designer component 120 interfaces with application generator component 114 for data virtualization of the data included in the designer.

The Data/Event propagation component is configured for propagating data collected by Data Collection Component 110 and stored in data storage 104 to be viewed by visual portal 118 as the data changes, without requiring refreshing of the visual portal.

Figure 3:
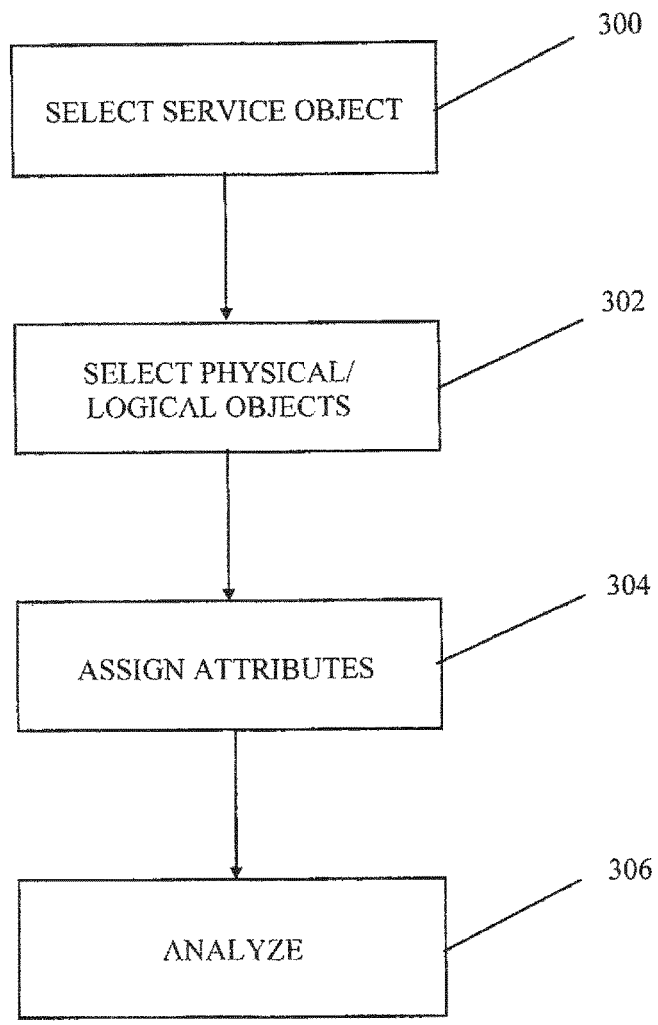
FIG. 3 shows a flow chart of a method of designing a service using the BSM system, according to some exemplary embodiments of the invention.

Reference is now made to FIG. 3 which shows a flow chart of a method of designing a service using BSM system 100, according to some exemplary embodiments of the invention. The following embodiment of the method described is for exemplary purposes and an ordinary person skilled in the art may find that there are many other ways in which the method may be practiced. In describing the method, reference is made to the components of FIGS. 1 and 2, where applicable.

At 300, a user authorized to design a service on the system logs into the system through any one of processing devices 106A, 106B, 106C, 106D, 106E. Optionally displayed on the display of the processing device is a "wizard" which directs the user as to the steps to follow. The user then opens a service object as part of a design process. Optionally, the service object is selected from a displayed tree-configuration of service objects available in the database in data storage 104. Optionally, the service object is selected from a category for example business services, technological services, infrastructure services, or HR services. In some embodiments, the user selects more than one service object. The selected service object is displayed on the display of the processing device.

At 302 the user selects the physical and/or logical and/or service objects associated with the resources defined by the user to be included in the design. Optionally, the process for selecting the physical and/or logical objects is similar to that described for selecting the service object. In some embodiments, the user creates the physical and/or logical objects on the processing device if the required objects are not available in the database. Alternatively, a system administrator or system designer creates the object based on user-defined requirements.

At 304, the user assigns the characters to the service object, the physical object and the logical object. The characters include an identification means for each object, and information associated with the service, and the physical and logical resources, required by the user. In some embodiments, the required object characters are obtained from the database in data storage 104. Additionally or alternatively, some or all of the characters are imported from one or more of the diverse data sources other than the database in data storage 104. Additionally or alternatively, some or all of the characters are manually input by the user into the system through the processing device. In some embodiments, data collection of the characters is performed by the system administrator or the system designer, with the information transferred to the respective objects based on the user requirement.

At 306, the user creates relationships between the previously selected resources in 304.

The user may assign characters to the relationship object as done in 304 (including all the gathering of the information).

Once the user has completed the design of the service with all objects in place, including their assigned characters, the design may be analyzed. Optionally, the analysis is an automatic process performed by BSM system 100 using known automatic evaluation techniques. Alternatively, the analysis is manually performed by the user. The user may then manage and/or monitor the service based on the resources selected by the user.

Examples of processing devices are 106A-106E, and which together with the above descriptions illustrate some embodiments of the invention in a non-limiting fashion.

The display may include a plurality of icons, which are infographic entities, as they not only present a physical resource or a logical resource, but also provide information related to the operation of the resource associated by the icon. For example, when the ruling color is green, it may denote that the device is operating correctly; when the ruling color is red, it may denote that the device is operating incorrectly; when the ruling color is red, and the icon is blinking, it may denote that the device requires an operator (user) intervention. Infographic information may be provided also by animation. For example, a current operation of pump may be presented by a rotating propeller in the icon that presents the pump. The infographic information may present also a quantity, percentage (e.g., overload on a server), etc.

Some of the icons may be connected by arrows. An arrow presents dataflow between the resources presented by the icons. An arrow may be unidirectional, thereby presenting dataflow from one resource to the other, or bidirectional, thereby presenting exchanging data between the resources.

An arrow is actually also an infographic element, and therefore the characters thereof may present additional information. For example, if the arrow is green, it means that the communication channel between the resources thereof is operating correctly, and if the arrow is red, it means that the communication channel between the resources thereof is disconnected.

An arrow also may present a relationship between the resources thereof. For example, a disk may be shared by a plurality of resources, and when the disk is not functioning, the resources that share the disk may be defined as not functioning as well.

The user interface allows easy definition of a relationship by "drilling down" into the icons. For example, after dragging an arrow between two icons on the control display, a user may double click the arrow, thereby entering into a form in which the characteristics may be defined. For example, such a form may allow a user to define relationship between the resources that an arrow connects, how to express a state in an icon attribute (such as color, blinking, etc.). The system is adapted to automatically analyze the operation of the controlled resources, according to the definition of the relationship between the resources presented by icons in the control display.

The user interface allows a user which is not an IT skilled person, to define a control display of IT (i.e., computer related devices) and non-IT (non-computer related devices) devices. The control display not only that displays the controlled layout of the resources inspected by the user, but also enables the user to manipulate their operation, such as disconnecting a working station, adding an additional communication port to the Internet, shutting down an air conditioner, and so on.

A sample display may be available to the user when entering identification information as part of the characters of a physical object.

A sample display may be available to the user of a service having completed its design, including respective infographics, according to some exemplary embodiments of the present invention.

A sample display may be available to the user when designing a service showing a wizard, for displaying information.

FIG. 4 depicts the physical events between the physical resources.

A device 122 manipulates physical and logical data flowing between the servers 142A, 142B, etc.

A controller 142C of an air-conditioner 142D may be controlled by signals, signaled either by a server 142A or by a server 142B, the servers backing one another. Pings 148B outputted from each of servers 142A and 142B indicate the presence of the communicated signals.

A network service team 150B is responsible to watch the presence of pings 148B.

A repair service team 150A is responsible that air-conditioner 142D, server 142A and server 142B are in order. Repair service team 150A inputs inputs 148A, being events, for indicating changes of the in-order statuses of resources 142A, 142B, 142C and 142D.

Repair service team 150A and network service team 150B, together, must ensure that air-conditioner 142D properly works.

However, in case repair service team 150A, being responsible to character A (in-order of resources A and B) physically disconnects server B (resource B) for repairing it, yet repair service team 150A does not remind itself regarding this event of the disconnecting. Following will be the solution described.

FIG. 5 is a block diagram of the example of FIG. 4, to be handled by the system.

Resource A may stand for server 142A;

Resource B may stand for server 142B;

Character A, enumerated 158A may constitute the in-order character of each resource, i.e. a database indication that resource A is in order (combination 152A), or resource B is in order (combination 152B); and Character B, enumerated 158B may constitute network pings 148B flowing from and to resource A (combination 152C), and flowing from and to resource B (combination 152D);

Servicing-item A, enumerated 150A, may stand for repair service team 150A; thus, servicing-item A handles character A only (through connection 154A), being the in-order character of any of the resources; and Servicing-item B, enumerated 150B, may stand for repair service team 150B; thus, servicing-item B handles character B only (through connection 154B), being the network pings of any of the resources.

FIG. 6 is the block diagram of FIG. 5, adding a streaming example obtained by the system.

Suppose the repair service team 150A, being responsible to character A (in-order of resources A and B) physically disconnects server B (resource B) for repairing it. Consequently, this operation ceases the network pings 148B of resource B, being character B of server B (resource B).

Apparently, server A backs server B up, thus air-conditioner 142D of FIG. 4 yet works properly. However, if server A later ceases, air-conditioner 142D will also cease.

The solution as shown in FIG. 6 is that network service team 150B, being responsible to character B (pings 148B) of resource B, initiates events 156 for reminding repair service team 150A the lack of network pings 148B (character B) of server B (resource B), even though repair service team 150A is not responsible to character B (pings 148B).

Thus, referring again to FIG. 4, network service team 150B delivers its event of character 158B regarding resource 142B, being received to repair service team 150A listening to events regarding resource 142B, even though repair service team 150A is responsible to character 158A of resource 142B.

Thus, in one aspect, the invention is directed to system for controlling physical and logical resources, the system including manipulation tools embodied on a device (122) for manipulating physical and logical data flowing between the resources (142A, 142B), the manipulation tools comprising
- at least two characters (158A, 158B) for each (142A) of the resources;
- at least two servicing-items (150A, 150B), each for handling one character (158B) of the at least two characters (158A, 158B), thereby at least one (142B) of the resources is serviced by the at least two servicing-items (150A, 150B);
- physical events (148A, 148B) delivered to and from the resources (142A, 142B), the physical events (148A, 148B) including inputs (148A) indicating physical changes in the resources (142A, 142B) and physical signals (148B) thereof; and
- logic events (156) between the at least two servicing-items, induced by the physical events (148A, 148B), wherein each (150B) of the at least two servicing-items delivers logic events of the logic events (156) regarding the one character (158B) handled thereby of the at least one (142B) of the resources being serviced by the at least two servicing-items (150A, 150B), to the other servicing-item (150A) not handling that character (158B).

According to the example of FIG. 4, servicing-item 150B has delivered logic event 156 regarding character 158B only of resource 142B to servicing-item 150A, even though servicing-item 150A does not handle character 158B. Since servicing-item 150A has received event 156 regarding resource 142B, servicing-item 150A will check character 158A of resource 142B

The resources may include at least one IT (information technology) device.

The logic events may be unidirectional or bidirectional.

In the figures and/or description herein, the following reference numerals have been mentioned:

| Part Identification | Part Ref. No. |
|---|---|
| BSM system | 100 |
| BSM server | 102 |
| Data Storage | 104 |
| Processing Devices | 106A-E |
| Communication System | 108 |
| Data Collection Component | 110 |
| Authorization Component | 112 |
| Application Generator Component | 114 |
| Rule Engine Component | 116 |
| Visual Portal Component | 118 |
| Designer Component | 120 |
| Device for | 122 |
| Resources | 142A-D |
| Servicing-item A | 150A |
| Servicing-item B | 150B |
| Input due to change on resource | 148A |
| Ping | 148B |
| Combination of resource and character | 152A-D |
| Association of character to servicing item | 154A, 154B |
| Logic event between servicing items | 156 |
| Characters of resources | 158A, 158B |

The foregoing description and illustrations of the embodiments of the invention has been presented for the purposes of illustration. It is not intended to be exhaustive or to limit the invention to the above description in any form.

Any term that has been defined above and used in the claims, should to be interpreted according to this definition.

The reference numbers in the claims are not a part of the claims, but rather used for facilitating the reading thereof. These reference numbers should not be interpreted as limiting the claims in any form.

What is claimed is:

1. A system for controlling a plurality of physical and logical resources of an organization, the system comprising:
    a computer for manipulating through a network, physical and logical data flowing from said computer to said plurality of resources of said organization and from said resources to said computer;
    at least two characters reflecting different types of physical and logical conditions for each of said resources, said at least two characters being embedded on said computer;
    at least two servicing-items reflecting said physical and logical services for said resources, each of said at least two servicing-items being embedded on said computer for recording values in real-time of one character only handled thereby of said at least two characters, thereby each of said resources is serviced by said at least two servicing-items, each for one character only of the resource;
    resource events delivered from said resources to said at least two servicing-items listening to said resource events, said resource events comprising inputs and signals indicating changes from said recorded values in said resources; and
    logic events between said at least two servicing-items, induced by said resource events,
    wherein each of said at least two servicing-items delivers logic events of said logic events regarding said one character only handled thereby of said at least one of said resources being serviced by said at least two servicing-items, in real-time to the other servicing-item not handling that character,
    thereby said logic event regarding that character not handled by said other servicing-item triggers said other servicing-item not handling that character to execute in real-time physical and logical operations onto each of said resources, thereby said computer cooperates in real-time between said physical and logical services of said resources of said organization reflected in said computer by said at least two servicing-items, to service each of said resources together, regardless of the different character of each of said resources that each of said said at least two servicing-items handles.

2. A system according to claim 1, wherein said resources comprise at least one IT (information technology) device.

3. A system according to claim 1, wherein said logic events are unidirectional.

4. A system according to claim 1, wherein said logic events are bidirectional.

5. A method for controlling a plurality of physical and logical resources of an organization, said method comprising:

using a computer for manipulating through a network, physical and logical data flowing from said computer to said plurality of resources of said organization and from said resources to said computer;

using at least two characters reflecting different types of physical and logical conditions for each of said resources, said at least two characters being embedded on said computer;

using at least two servicing-items reflecting physical and logical services for said resources, each of said at least two servicing-items being embedded on said computer, each for recording values in real-time of one character only handled thereby of said at least two characters, thereby each of said resources is serviced by said at least two servicing-items, each for one character only of the resource;

using resource events delivered from said resources to said at least two servicing-items listening to said resource events, said resource events comprising inputs and signals indicating changes from said recorded values in said resources; and using logic events between said at least two servicing-items, induced by said resource events, wherein each of said at least two servicing-items delivers logic events of said logic events regarding said one character only handled thereby of said at least one of said resources being serviced by said at least two servicing-items, in real-time to the other servicing-item not handling that character, thereby, said logic event regarding that character not handled by said other servicing-item triggers said other servicing-item not handling that character to execute in real-time physical and logical operations onto each of said resources, thereby said computer cooperates in real-time between said physical and logical services of said resources of said organization reflected in said computer by said at least two servicing-items, to service each of said resources together, regardless of the different character of each of said resources that each of said said at least two servicing-items handles.

* * * * *